US 6,289,220 B1
Sep. 11, 2001

(12) United States Patent
Spear

(54) MULTIPLE CONTROLLER IDENTITIES FOR NEIGHBOR LISTS

(75) Inventor: Stephen L. Spear, Skokie, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/602,171

(22) Filed: Jun. 22, 2000

(51) Int. Cl.[7] .................................................. H04Q 7/20
(52) U.S. Cl. ........................ 455/436; 455/440; 455/438; 370/331
(58) Field of Search ................................. 455/436, 437, 455/438, 439, 442, 525, 440, 443; 370/331, 342, 335

(56) References Cited

U.S. PATENT DOCUMENTS 5,509,051 * 4/1996 Barnett et al. ....................... 455/443
5,722,072 * 2/1998 Crichton et al. ..................... 455/437
5,854,981 * 12/1998 Wallstedt et al. .................... 455/422
5,982,758 * 11/1999 Hamdy ................................ 370/331
6,061,337 * 5/2000 Light et al. .......................... 455/440
6,181,946 * 1/2001 Gettleman et al. .................. 455/509

* cited by examiner

Primary Examiner—Dwayne Bost
Assistant Examiner—Sonny Trinh

(57) ABSTRACT

A method and system of generating neighbor cell lists in a cellular environment having a first cell and a plurality of neighbor cells. The first cell and the neighbor cells each include a plurality of designated active controllers associated therewith. In one embodiment, the method includes the steps of designating one of the controllers in the first cell as the active controller for the first cell, generating a first neighbor list of the active controllers for the neighbor cells, and generating a second neighbor list of the active controllers for the neighbor cells upon the change in active status of any of the neighboring active controllers. The lists are generated in accordance with a database of controllers linkable with the designated active controller.

21 Claims, 4 Drawing Sheets

MULTIPLE CONTROLLER IDENTITIES FOR NEIGHBOR LISTS

BACKGROUND OF THE INVENTION

The present invention relates to digital wireless communication systems. More particularly, the present invention relates to a method of generating a list of neighboring active controllers and their identity information to facilitate handoff of a mobile communication.

In cellular mobile communication systems, a mobile handset communicates with base transceiver stations ("BTS's") positioned throughout a geographic area. Each BTS broadcasts on a discrete radio channel within a specified coverage area. A multiplicity of BTS sites may produce an array of cells to allow the system to provide radio coverage over a wide geographic area.

During a call, the user of a mobile handset will often move between neighboring cells within the system. As the mobile handset moves from one cell to a neighboring cell, the base station controller ("BSC") of the serving cell typically transfers the call session to the BTS of the neighboring cell. This transfer of the call is termed "handoff."

In digital cellular communication systems, such as those utilizing TDMA or CDMA signal transmission protocols, communications between multiple BTS sites and mobile handsets are carried out on radio frequency channels that can carry simultaneous communications. Using these digital protocols, communication sessions are typically performed using digitized voice or data signals that are transmitted as coded bursts or bursts within specified time slots. The coded bursts or time slots corresponding to multiple communication sessions are multiplexed onto the radio channels of the respective cells, and each mobile handset reads and communicates on an assigned decoded channels or assigned time slots on sending and receiving channels. Handoff in digital systems is typically performed using measurements from the mobile handset itself. Known as mobile-assisted handoff ("MAHO"), the method utilizes the mobile handset to periodically monitor and measure radio signals of neighboring BTS sites.

The list of neighbors that the mobile handset measures on a periodic basis is typically contained in a "neighbor cell list" of the cell that is presently serving the handset. The list may be kept on a database maintained at the site of the serving BTS, retained at a radio network controller ("RNC") site controlling a plurality of BTS's, or at a centralized mobile switching center ("MSC"). In order to compare measured signals from the neighbors on the neighbor list with the measured signal from the serving cell, the mobile station transmits the results of its measurements to the serving BTS. The serving BTS will in turn forward the measurements to either the applicable RNC's or to the MSC. If the received signal strength of the current channel in the serving cell falls below a threshold or is otherwise lower than the signal strength of a measured channel of a neighboring cell, the MSC or RNC may initiate handoff of the mobile handset's call session to the neighboring cell.

One advantage of digital CDMA or TDMA systems over analog systems is that mobile handsets have the ability to participate in "soft handoff." During soft handoff, the mobile handset communicates simultaneously with multiple base transceiver stations. The mobile handset establishes a new connection with a neighboring BTS before terminating the connection with the BTS of the serving cell. This allows the mobile handset to avoid call disruptions and interference during the handoff procedure.

In newer cellular infrastructure designs, it has become desirable to allow a single RNC or a plurality of RNC's to control more than one BTS. In a soft handoff situation, this configuration is advantageous because the controller for the serving cell may be able to communicate with a first controller for a neighboring cell to arrange handoff, process measurements or receive call data from the mobile handset, while the mobile handset may simultaneously communicate with a second controller for the neighboring cell to initiate the soft transfer of the communication. A multiple controller configuration would allow for smoother soft handoffs because the resources of one controller may be prioritized for measurement and transfer procedures and the other controller may focus on handling the actual multiplexed communication. In other situations, a cell having multiple controllers may be more receptive to transferred communications from neighboring cells because the additional number of controllers increases the cell's communication processing resources.

In present cellular systems, a BTS-handled call session is typically controlled by a single controller as specified by the present CDMA and TDMA standards. This controller is responsible for sending call information through the MSC to controllers or directly to controllers for neighboring cells during the measurement and handoff procedures. Each cell includes an associated neighbor list which includes information on which the BSC controls the neighboring cell. When the serving BSC determines the need for a hard or soft handoff to a neighboring cell which is not under its control, it must communicate with the controller of the neighboring cell. If more than one controller is operating on a neighboring cell, some procedure must be used to allow the serving controller to communicate with the active controller of the new cell.

BRIEF SUMMARY OF THE INVENTION

In the present invention, the neighbor cell database which is used to identify neighboring cells from serving cells is updated with additional entries or alternative database configurations as soon as controllers are activated or changed for cells within the system. The neighbor database may therefore be expanded according to the present invention to take into account multiple controllers for single cells. In other embodiments, a cell which changes its primary controller or activates a non-active controller may broadcast a system-wide message to inform neighboring controllers of a change in controller status. Neighboring controllers can utilize this information to identify the controller that they need to communicate with or alternative controllers for use to facilitate communications with neighboring cells during handoff. The change in status notification can also include information relating to necessary communication parameters either in the form of direct notification or through the updating of entries in a neighbor database.

The present invention may be implemented in cellular systems in which base transceiver stations in at least some parts of the system have more than one controller.

In one aspect of the present invention, a method of generating neighbor cell lists in a cellular system is provided. The system implementing this embodiment includes a first cell and a plurality of neighbor cells. The first cell and the neighbor cells each include a plurality of designated active controllers associated therewith. The method includes the steps of designating one of the controllers for the first cell as the active controller for the first cell, generating a first neighbor list of the active controllers for the neighbor cells, and generating a second neighbor list of the active controllers for the neighbor cells upon the change in active status of any of the neighboring active controllers. The lists are generated in accordance with a database of controllers linkable with the designated active controller. The database includes address information for each controller.

In another embodiment of the present invention, a method of modifying neighbor cell lists in a cellular system is provided. The system includes a first cell and a plurality of neighbor cells, the first cell having a plurality of controllers associable therewith. The method includes the steps of designating one of the controllers in the first cell as the first designated active controller for the first cell, generating an entry in a first neighbor cell list for each of the neighbor cells corresponding to the first designated controller for the first cell, designating another of the controllers for the first cell as the second designated active controller for the first cell, and modifying the entries in the neighbor cell lists to reflect the designation of the second designated active controller for the first cell.

In another aspect of the present invention, a method of assigning a communication session among cells in a cellular system via a mobile handset is provided. The system includes a first cell and a plurality of neighbor cells, the first cell having at least a first and a second controller associable therewith. Each of the neighbor cells includes at least a first and a second controller associable therewith. The method includes the steps of generating a communication session in a mobile handset, processing communication information from the session in the first controller for the first cell, and generating a first allocation entry in a neighbor cell list for at least some of the neighbor cells. The entry indicates that the first controller is active for the first cell. After information processing in the first cell is transferred from the first controller to the second controller for the first cell, a second neighbor allocation entry is generated for at least some of the neighbor cells indicating that the second controller is active in the first cell.

The invention may also be embodied in a system for generating neighbor cell lists in a cellular environment, which includes a first cell and a plurality of neighbor cells. The system includes a plurality of controllers associated with the first cell and at least some of the neighbor cells. Each of the cells includes at least one of the associated controllers designated as an active controller for each cell. The active controller associated with the first cell is in communication with other controllers, and the active controller for the first cell is able to access a first neighbor list of controllers for one or more neighbor cells in accordance with a neighbor list database. The database includes communication parameters necessary for communication between controllers for neighboring cells and the active controller for the first cell. Notification means is linked to the first active controller for notifying the controllers associated with the neighbor cells of a change in active status of any of the active controllers.

DETAILED DESCRIPTION OF THE INVENTION

Figure 1:
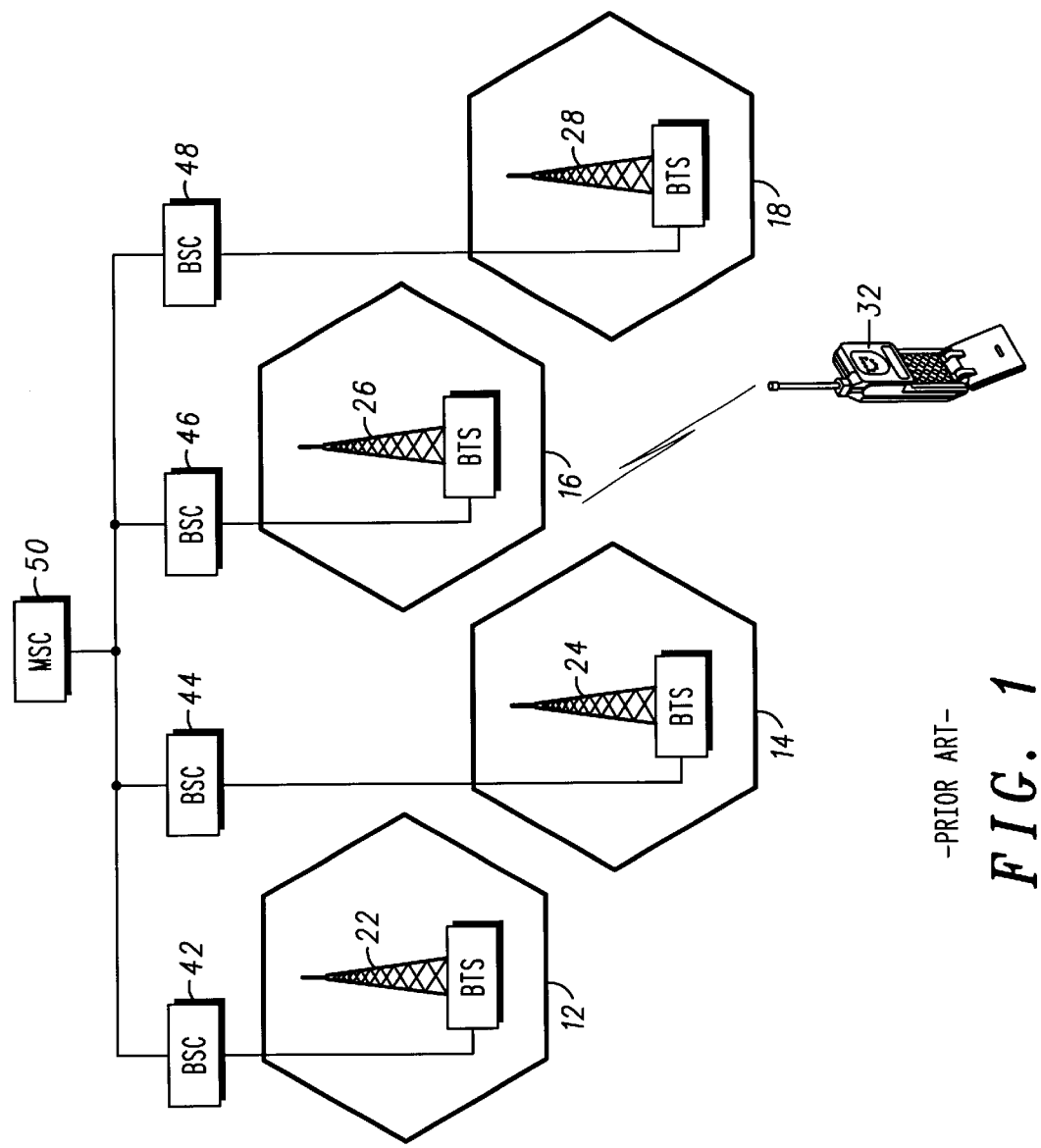
FIG. 1 illustrates a prior art analog cellular system showing four cells.

FIG. 1 shows a schematic block diagram of a prior art digital cellular system which implements single base station controllers ("BSC") allocated for each cell. The system 10 includes a plurality of cells 12, 14, 16 and 18, each having a base transceiver station ("BTS") antenna 22, 24, 26 and 28, respectively. Each BTS is preferably linked to a separate BSC that processes the multiplexed digital signals from mobile handsets 32. In particular, BSC's 42, 44, 46 and 48 are linked to the cells 12, 14, 16 and 18, respectively. The BSC's also perform relative radio signal strength calculations to evaluate and compare signals among neighboring cells. Various neighbor lists are generated by processors which may be located within the BSC's. Handoff of communications from the mobile handsets 32 are coordinated and handled by the centralized mobile switching station 50, which is linked to each BSC 32, 44, 416 and 48 within the system 10.

Figure 2:
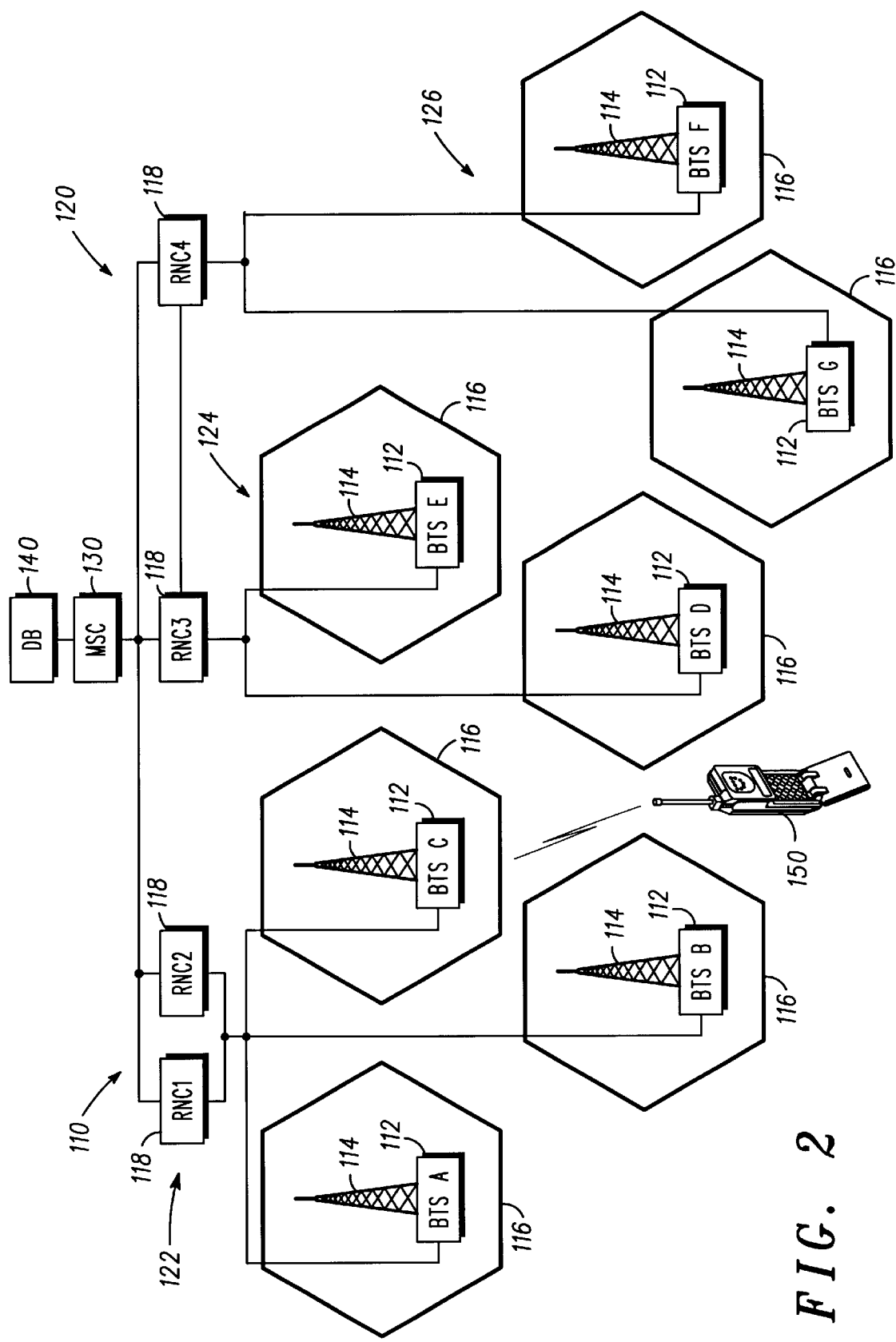
FIG. 2 illustrates a cellular telecommunication system of a type to which the present invention generally pertains, and illustrates seven exemplary cells within the system.

FIG. 2 is a schematic block diagram showing a digital cellular communication system preferably utilizing the CDMA standard in implementing a plurality of radio network controllers ("RNC") throughout the network. Preferably, more than one RNC may control more than one particular base transceiver station ("BTS") in the system. As shown in the figure, a plurality of base transceiver stations provides coverage throughout the system 112. For purposes of clarity, each BTS shown will be referred to here as "BTS A", "BTS B" and "BTS C", etc. Consistent with the prior art, each BTS includes a preferably centrally located base station antenna 114, and transmits over a range that generally covers the hexagonal-shaped cells 116 as shown in the diagram.

The plurality of radio network controllers coordinate the various BTS's within the system 110. For clarity, each radio network controller will be referred to by its respective number: RNC1, RNC2, RNC3, and RNC4. In particular, RNC1 and RNC2 are available to provide control over BTS A, BTS B, and BTS C as shown. RNC1 and RNC2 are interconnected to provide a subsystem 122. RNC3 controls BTS D and BTS E, and forms a subsystem 124. RNC4 controls BTS F and BTS G to form a subsystem 126. RNC3 and RNC4 are interconnected, and all RNC's 1–4 are interconnected with the MSC 130. The MSC 130 may provide control and coordination instructions to all of the RNC's within the system 110.

Preferably, a database processor 140 including appropriate storage means (not shown) is linked to MSC 130 to provide control information and to store neighbor list update information as will be described further below. The processor 140 preferably runs software to maintain records and information relating to the identity of controllers for neighboring cells and the address information associated therewith. A mobile handset 150 is shown in the Figure and transmits radio signals to any of the cells present in the system 110.

Figure 3:
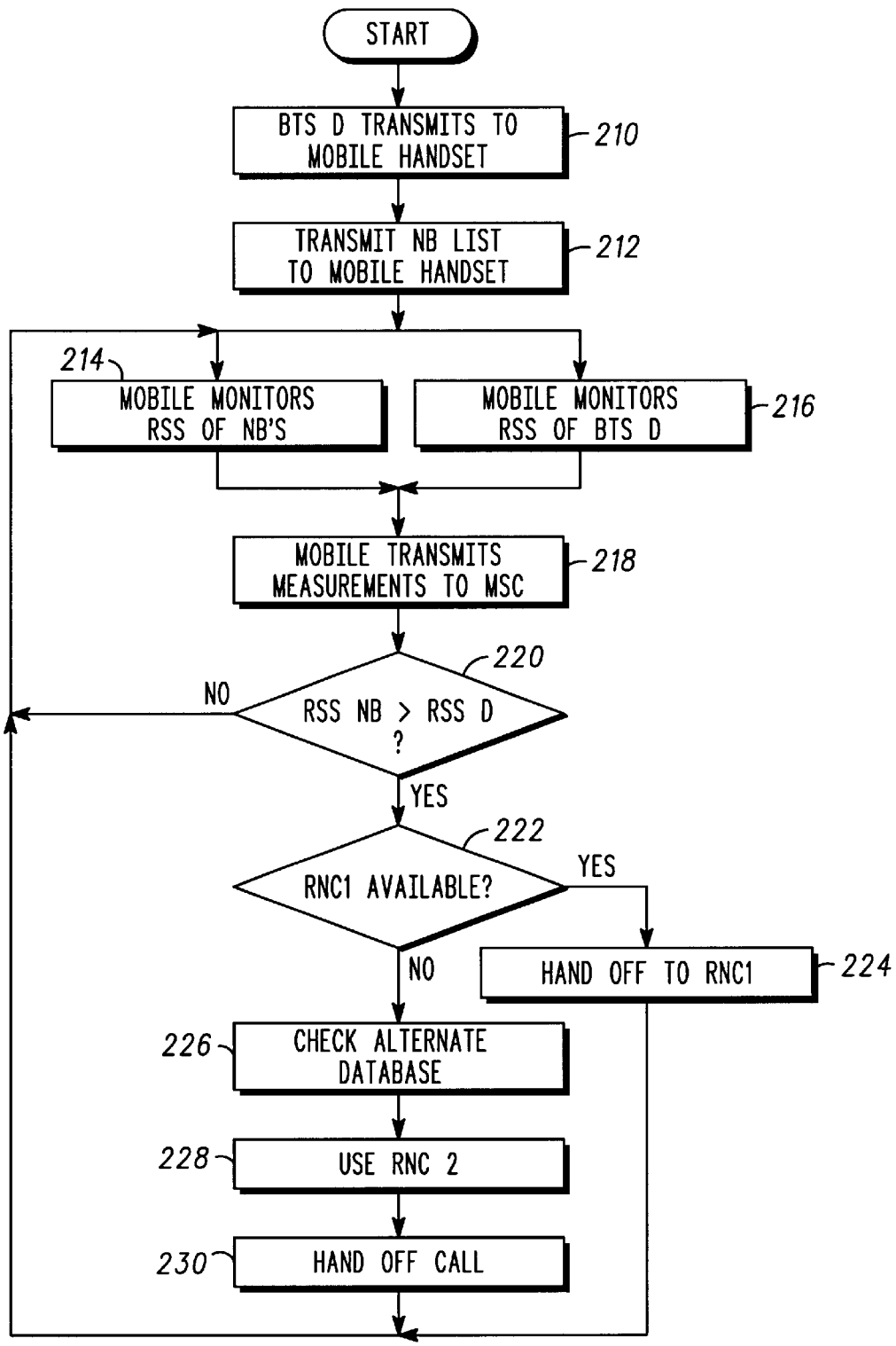
FIG. 3 is a flow diagram illustrating a first embodiment of a method of handing off a cellular communication utilizing the present invention.

FIG. 3 shows a first embodiment of a method of the present invention. The method allows RNC's to determine which other RNC's are controlling particular cells when more than one RNC might be controlling each cell. For example, if a call were to be transferred from cell D to cell C, the controlling BTS D would need to determine whether RNC1 or RNC2 (or both) is (are) the designated active controller that is presently controlling BTS C.

The system of FIG. 2 will be utilized in conjunction with a description of the method of FIG. 3. Other digital communication environments and systems, such as TDMA, may be utilized in implementing the present invention. Referring to FIG. 2, it will be assumed that a call session between mobile handset 150 is presently preceding and being served by the cell 116 D and BTS D. As shown in the diagram, the neighbors of BTS D are cells C, E, F, and G. In the present example, neighbor C is under the control of RNC1, neighbor cell C is under the control of RNC3, neighbor cell F is under the control of RNC4 and the neighbor cell G is also under the control of RNC4.

Referring now to FIG. 3, the communications are preceding between BTS D and the mobile handset 150 at box 210. The presently known neighbors and associated control RNCs are transmitted in the form of a neighbor list from BTS D to the mobile handset 150 at box 212. Preferably, the neighbor list resides on a database within the BTS D, although it may also reside within the controlling RNC3 or the MSC 130. BTS D is also presently controlled by RNC3. The transmitted neighbor list for cell D includes the information summarized in the following table.

TABLE 1

CELL D NEIGHBOR DB

| Neighbor | Control |
|---|---|
| CELL C | RNC 1 |
| CELL E | RNC 3 |
| CELL F | RNC 4 |
| CELL G | RNC 4 |

After transmission of the neighbor list to the mobile handset 150 at step 212, the handset 150 and the system 110 monitors the radio environment to determine whether handoff of the call is appropriate. The mobile handset 150 preferably monitors the signal strength of the neighbors on the list at box 214. Simultaneously, the mobile handset 150 also monitors the signal strength of signals received from the BTS D at box 216. Other measurement parameters may also be used to determine handoff, such as bit error rate, etc. Furthermore, other cells besides neighbors, such as selected cells, may be the subject of measurements, instead of the entire group of neighbors. After measurements are taken, the mobile handset 150 periodically transmits measurements of the signal strength to its controlling RNC3 or the MSC 130 at box 218. At box 220, the determination is made as to whether the signal strength of a neighbor is greater than the signal strength measured from BTS D. If not, then BTS D remains the serving BTS and the measurement process continues periodically at steps 214 and 216 above. If the signal strength of a neighbor is higher than that of the signal strength received from BTS D, a handoff procedure is initialized at box 222. One skilled in the art will recognize that other handoff determinates, such as threshold values, may be used.

Assuming that the mobile handset 150 is moving towards cell C, handoff is eventually initiated between BTS D and BTS C and is overseen by the MSC 130. If it is determined at box 222 that RNC1, which is shown in Table 1 to presently be controlling BTS C, is available, the MSC 130 hands off the call session from BTS D to BTS C. Control is also transferred from RNC3 to the active controller RNC1. If it is determined at box 222 that RNC1 is not available or is not responding to a handoff request from the RNC3, the system 110 would check an alternate database 226 of alternative controllers for the base transceiver stations on a particular neighbor list.

An example of alternative control designations for the neighbor list of Table 1 is shown below in Table 2.

TABLE 2

CELL D NEIGHBOR DB

| Neighbor | Control | Alternative |
|---|---|---|
| CELL C | RNC 1 | RNC 2 |
| CELL E | RNC 3 | RNC 4 |
| CELL F | RNC 4 | RNC 3 |
| CELL G | RNC 4 | RNC 3 |

As shown in Table 2, neighbor cell C may be controlled by either RNC1 or alternative controller RNC2. Neighbor cell E is controlled by RNC3 for the alternative controller RNC4. Cells F and G, which are presently controlled by RNC4, may be controlled in the alternative by RNC3. By checking the alternate database of Table 2 at box 226, it is determined that RNC2 is the proper alternative controller for cell C when the present controller RNC1 is unavailable. Thus, RNC3 changes its communication parameters to communicate properly with RNC through the MSC 130 at box 228. At box 230, the call session is handed off between BTS D to 2BTS C.

RNC1 may be unavailable for any number of reasons, including a system failure, overcapacity or to facilitate soft handoff between BTS D and BTS C. Proper communication parameters that must be known by the serving cell and the serving controller are also stored in the neighbor database for the alternative controller designated for each neighboring cell.

Figure 4:
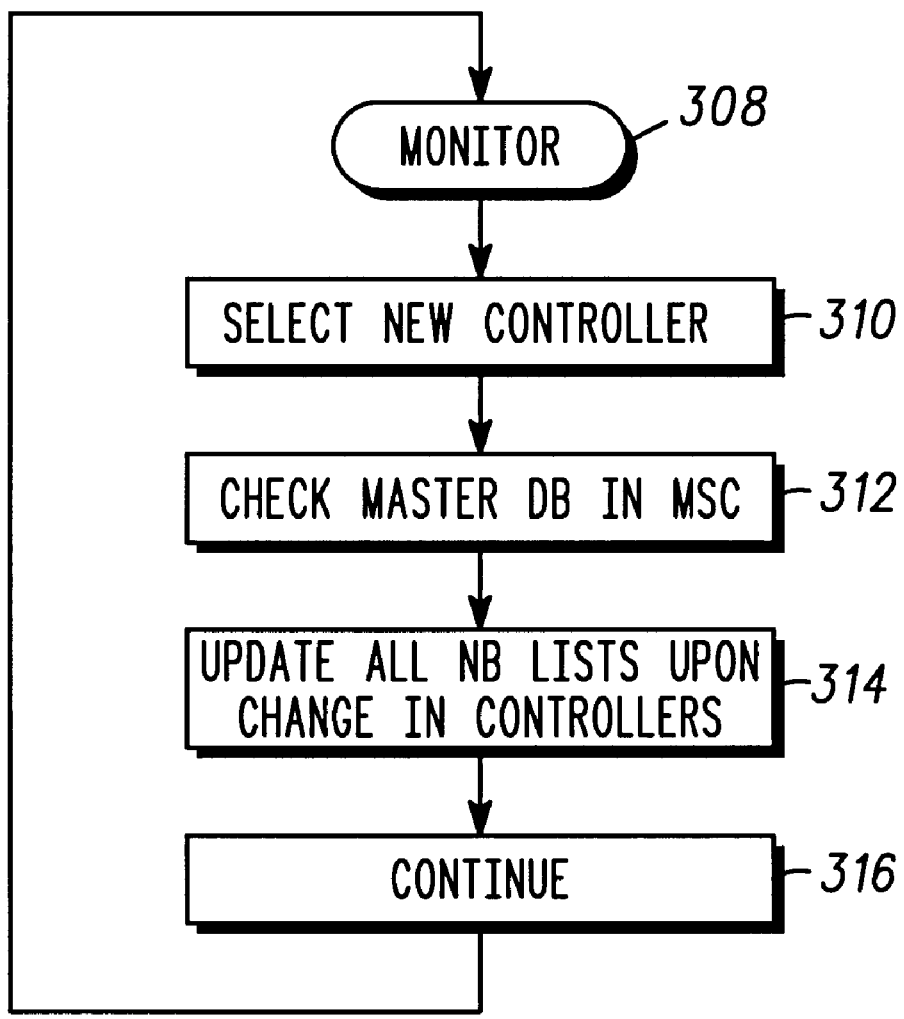
FIG. 4 is a flow diagram showing another embodiment of the method of the present invention.

FIG. 4 is a flow diagram showing a second embodiment of a method of the present invention. In this embodiment, a change in the active designated RNC for particular cells is triggered by an update notice announcement sent via the MSC 130 to at least all neighboring cells within the system 110. In the alternative, this broadcast message from the MSC 130 may be sent to selected cells which require knowledge and particular communication parameters for communicating with the changed designation of RNC for a particular controller. Thus, the neighbor databases and associated control information that each cell 116 requires when transferring a call session to another cell is updated as necessary when the designated active controller in any cell within the system 110 is changed. The updating procedure may be initiated by either a broadcast message via the MSC 130 or via an updating procedure initiated by the MSC 130 upon notice received from a cell informing it of a designated active controller change.

Utilizing the same cell structure described in conjunction with FIG. 3 and shown in FIG. 2, the present description assumes that a call session is presently preceding between mobile handset 150 and the serving cell D. BTS D for the serving cell D is presently controlled by RNC3. A neighbor list for BTS D presently residing on either the RNC3 or the MSC 130 is preferably as shown in Table 2 above.

For a variety of reasons, the changing of an active network controller in one cell may require changes in the RNCs for other cells. For example, one RNC may only be able to communicate with controllers that can operate on information of a particularly high bandwidth. Thus, the selection of this controller would necessitate neighboring cells to switch to other controllers that are able to transmit and receive on a similar high bandwidth. Thus, the serving cell must update its neighbor list so that it becomes aware that control has changed in neighboring cells and alternate communication parameters may be used to communicate with the newly designated controller.

As shown in FIG. 4, a change in controllers designated as active for neighbors of cell D occurs at box 310. In particular, cell C, which presently designates RNC1 as its active controller, switches its active controller to RNC2. Cell E, which utilizes RNC3 as its designated active controller, switches the active controller to RNC4. The change in controllers are summarized in Table 3 below.

TABLE 3

CELL D NEIGHBOR DB

| Neighbor | Control |
|----------|---------|
| CELL C   | RNC 2   |
| CELL E   | RNC 4   |
| CELL F   | RNC 4   |
| CELL G   | RNC 4   |

At box 312, a master database residing on the processor 140 interfaces with the MSC 130 to preferably check all affected neighbor lists. These are the cells that will be needed to communicate with the designated proper controller for cells C and E within a system 110. At box 314, all neighbor lists are updated to reflect the change in control for cells C and E. At box 316, the MSC 130 continues to monitor any changes in active controllers throughout the system 110. Preferably, at box 308, the MSC 130 continuously monitors the RNCs within the system 110 to detect any changes in the designated active controllers for particular cells within the system 110.

Of course, it should be understood that a wide range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. A method of generating neighbor cell lists in a cellular system, the system including a first cell and a plurality of neighbor cells, the first cell and the neighbor cells each including a plurality of designated active controllers associated therewith, the method including the steps of:

designating one of the controllers for the first cell as the active controller for the first cell;

generating a first neighbor list of the active controllers for the neighbor cells, the list being generated in accordance with a database of controllers linkable with the designated active controller, said database including address information for said controllers; and generating a second neighbor list of the active controllers for the neighbor cells upon the change in designation of any of the neighboring active controllers to a non-active controller, the list being generated in accordance with the database.

2. The method of claim 1 further comprising the step of:

providing a database of communication link information to enable communication between network controllers, the information including communication addresses for the active controllers corresponding to the neighbors on the neighbor lists.

3. The method of claim 1 further comprising the step of:

receiving information from one or more controllers in the network identifying a change in the active designation of one or more controllers.

4. The method of claim 3 further comprising the step of alerting other controllers upon said change in active designation of any of the active controllers within said system.

5. A method of modifying neighbor cell lists in a cellular system, the system including a first cell and a plurality of neighbor cells, the first cell having a plurality of controllers associable therewith, the method including the steps of:

designating one of the controllers in the first cell as the first designated active controller for the first cell;

generating an entry in a first neighbor cell list for each of the neighbor cells corresponding to the first designated controller for the first cell;

designating another of the controllers for the first cell as the second designated active controller for the first cell; and modifying said entries in said neighbor cell lists to reflect the designation of the second designated active controller for the first cell.

6. The method of claim 5 wherein the said entries in said neighbor cell lists incorporate changes in parameters necessary for communication between the second designated active controller for the first cell and controllers of neighbor cells.

7. The method of claim 6 further comprising the step of detecting the change from the first designated active controller to the second designated active controller for the first cell.

8. The method of claim 6 further comprising the step of alerting controllers within the system of the change from the first designated active controller to the second designated active controller for the first cell.

9. The method of claim 8 further comprising the step of passing to other controllers any changes in communication parameters necessary for communication between the first cell and the neighbor cells.

10. A method of assigning a communication session among cells in a cellular system via a mobile handset, the system including a first cell and a plurality of neighbor cells, the first cell having at least a first and a second controller associable therewith, each of the neighbor cells including at least a first and a second controller associable therewith, the method including the steps of:

generating a communication session in a mobile handset;

processing communication information from said session in said first controller for said first cell;

generating a first allocation entry in a neighbor cell list for at least some of said neighbor cells, the entry indicating that said first controller is active for said first cell;

transferring the processing of information from said session in said first cell from said first controller to said second controller for the first cell; and generating a second neighbor allocation entry for at least some of said neighbor cells indicating that said second controller is active for said first cell.

11. The method of claim 10 further comprising the step of referencing a database of cell allocations corresponding to the designated active controllers within cells having more than one controller.

12. The method of claim 11 wherein the second entry incorporates changes in parameters necessary for communication between the second controller for the first cell and controllers of neighbor cells.

13. The method of claim 12 further comprising the step of detecting the change from the first controller for the first cell to the second controller for the first cell.

14. The method of claim 12 further comprising the step of alerting controllers within the system of the change in processing from the first controller for the first cell to the second controller for the first cell.

15. The method of claim 14 further comprising the step of passing to the controllers of the neighbor cells any changes in communication parameters necessary for transfer of the processing of said communication.

16. The method of claim 10 further comprising the step of referencing said second allocation entry before handing off another communication from one of said neighboring cells to said first cell.

17. A system for generating neighbor cell lists in a cellular environment, the cellular environment including a first cell and a plurality of neighbor cells, the system comprising:

a plurality of controllers associated with the first cell and at least some of the neighbor cells, each of the cells having at least one of the associated controllers designated as an active controller for each cell;

the active controller associated with the first cell being in communication with other controllers, said active controller for said first cell being able to access a first neighbor list of controllers for one or more neighbor cells in accordance with a neighbor list database, said database including communication parameters necessary for communication between controllers for neighboring cells and said active controller for said first cell; and notification means linked to the first active controller for notifying the controllers associated with the neighbor cells of a change in active status of any of the active controllers.

18. The system of claim 17 wherein said controllers include switching centers, wherein said switching centers can control controllers for said neighbor cells.

19. The system of claim 17 wherein the database also updates controller communication parameter entries in said neighbor list database upon a change in active status of any of the active controllers.

20. The system of claim 19 wherein the notification means further comprises monitoring means in communication with the controllers for determining a change in the active status of any of the active controllers.

21. The system of claim 18 wherein said switching center designates one of the controllers in the first cell as an active controller.

* * * * *